(12) United States Patent
Korpet et al.

(10) Patent No.: US 7,386,034 B2
(45) Date of Patent: Jun. 10, 2008

(54) ANTI-JAMMING METHOD FOR SPREAD-SPECTRUM RADIO SIGNAL RECEIVERS

(75) Inventors: Damien Korpet, Romains/sur/Isere (FR); Alain Renard, Chabeuil (FR)

(73) Assignee: Thales, Neuilly sur Seine (FR)

( * ) Notice: Subject to any disclaimer, the term of this patent is extended or adjusted under 35 U.S.C. 154(b) by 553 days.

(21) Appl. No.: 10/497,393

(22) PCT Filed: Dec. 6, 2002

(86) PCT No.: PCT/FR02/04222

§ 371 (c)(1),
(2), (4) Date: Jun. 1, 2004

(87) PCT Pub. No.: WO03/055102

PCT Pub. Date: Jul. 3, 2003

(65) Prior Publication Data

US 2005/0078739 A1   Apr. 14, 2005

(30) Foreign Application Priority Data

Dec. 18, 2001 (FR) .................... 01 16399

(51) Int. Cl.
*H04B 1/00* (2006.01)

(52) U.S. Cl. ............... 375/148; 370/203; 455/507; 701/200

(58) Field of Classification Search ......... 375/130, 375/144, 350, 148; 342/420, 362; 370/203; 455/507; 701/200
See application file for complete search history.

(56) References Cited

U.S. PATENT DOCUMENTS

| 5,781,152 | A | 7/1998 | Renard |
| 5,822,376 | A | 10/1998 | Renard |
| 5,850,420 | A | 12/1998 | Guillard |
| 5,933,421 | A | 8/1999 | Alamouti et al. |
| 6,081,691 | A | 6/2000 | Renard |
| 6,115,409 | A * | 9/2000 | Upadhyay et al. .......... 375/144 |
| 6,144,339 | A | 11/2000 | Matsumoto et al. |

(Continued)

FOREIGN PATENT DOCUMENTS

EP   0 942 540   9/1999

(Continued)

*Primary Examiner*—Shuwang Liu
*Assistant Examiner*—Michael R Neff
(74) *Attorney, Agent, or Firm*—Lowe Hauptman Ham & Berner, LLP

(57) ABSTRACT

The invention relates to the improving of the resistance to intentional or unintentional jamming, of a receiver of spread spectrum radio signals transmitted by polarized wave. It consists in furnishing receiver with an array antenna composed of elementary antennas having at least one so-called matched output path MP sensitive to the polarization of the polarized wave used for the transmission, certain furthermore having a second so-called cross path CP sensitive to a polarization orthogonal to that of the polarized wave used for transmission and in performing first individual antijamming processings by polarimetric filtering on each of elementary antennas with matched MP and cross CP output paths then, globally, at the level of reception signals obtained and of reception signals of elementary antennas without cross output path CP utilized, a second general antijamming processing by spatial filtering. Moreover, the invention can integrate additional antijamming processings by temporal or spectral filtering.

21 Claims, 5 Drawing Sheets

| U.S. PATENT DOCUMENTS | | | FOREIGN PATENT DOCUMENTS | | |
|---|---|---|---|---|---|
| 6,201,801 B1 | 3/2001 | Dent | FR | 0204509 | 12/2002 |
| 6,317,078 B1 | 11/2001 | Renard | WO | 97 40588 | 10/1997 |
| 6,345,177 B1 | 2/2002 | Renard | | | |
| 6,861,983 B2 * | 3/2005 | Casabona et al. ........... 342/420 | * cited by examiner | | |

ANTI-JAMMING METHOD FOR SPREAD-SPECTRUM RADIO SIGNAL RECEIVERS

FIELD OF THE INVENTION

The invention relates to receivers of spread spectrum radio signals transmitted by circular polarized wave. It is more particularly concerned with improving the resistance to intentional or unintentional jamming of these receivers.

BACKGROUND OF THE INVENTION

Spread spectrum signals are widely used for the transmission of data when, for various reasons, the instantaneous power of the signal received is low, often below the thermal noise of the input stages of the receiver. Specifically, the spreadband transmission technique consists in transmitting information via an HF carrier modulated by a broadband signal. The band of the signal is then spread and occupies a frequency band equal to that of the modulating signal. This technique makes it possible to improve the resistance of the transmission to jamming by giving the signal transmitted a frequency spectrum akin to that of broadband noise. It makes it possible, moreover, by employing orthogonal codes for the modulating signal, to provide for the coexistence of several simultaneous transmission paths (code-based multiple access).

The spectrum spreading is usually obtained by phase-modulating the binary data to be transmitted or their transmission carrier by means of a pseudo-random binary string which plays the role of encryption code. Despreading at reception is done by correlating the signal received with a copy of the pseudo-random binary string that served for the spreading, which copy is produced locally in synchronism with that modulating the signal received. The correlation of despreading, over the duration of the pseudo-random binary string that served for the spreading or over a greater duration, less however than that of a datum transmitted enables the datum transmitted to be made to stand out from the ambient noise in which it was embedded.

For the transmission of radio signals in free space, use is made of a pair of transmit and receive antennas matched to one another in the sense that the receive antenna is designed to have maximum sensitivity with the waveform produced by the transmit antenna. The radio wave for a circularly polarized wave, has its electric field vector describing, in one or other direction, a circle (an ellipse) in a plane orthogonal to the direction of propagation defined by the straight line joining the pair of transmit and receive antennas. Two types of polarization are orthogonal if they correspond to waves whose electric field vectors are always orthogonal. When two waves have orthogonal polarizations, they are said to have cross-polarizations. A receive antenna optimized for a polarization exhibits minimum sensitivity for the cross-polarization. It is commonly accepted that the difference in sensitivity may reach 30 dB.

Between two mobiles or between a mobile and a fixed station, use is usually made of transmit and receive antennas corresponding to a radio wave with right or left circular polarization since such a radio wave has the advantage of being less sensitive to the propagation conditions which may introduce a rotation of the polarization plane and of being able to be picked up independently of variations in the attitude of the receive antenna with respect to the transmit antenna. In the case of right circular polarization, the cross-polarization is left circular polarization and vice versa.

One of the problems posed by the transmission of data by means of spread spectrum radio signals is the sensitivity of the receivers to nearby jammers, in particular in the case of transmissions of data with satellites, given the low power available onboard and the considerable distances separating transmitter and receiver. It is particularly acute in respect of satellite navigation systems where the receivers of navigation signals originating from satellites equip carriers deploying on the surface or in the vicinity of the surface of the globe in zones where the radio activity may be considerable.

A receiver of the satellite navigation system known by the name "Navstar Global Positioning System" (GPS) must be capable of utilizing a signal emitted by a satellite some twenty thousand kilometers away with a power of the order of some ten watts and reaching it with a power that is 20 dB below the ambient thermal noise. It is found at the output of the receive antenna with an input signal having a power of the order of −130 dBm that the gain of the despreading processing allows it to extract noise. However, the initial acquisition of synchronism between the pseudo-random binary string produced locally and that which modulated the signal emitted, which is necessary for the despreading operation, becomes difficult in the presence of a jamming signal having a power of more than 30 dB greater than that of the GPS signal, this representing a jamming signal power of the order of only −100 dBm which it is not difficult to exceed for an intentional or unintentional jammer placed at a distance from the receiver that is much smaller than the navigation satellites from which the useful signals originate.

Numerous procedures for decreasing the sensitivity of spreadband radio signals receivers to jamming have already been proposed. These known procedures implement three types of processing of the signal received: spectral or temporal filtering, spatial filtering and polarimetric filtering.

The antijamming techniques that call upon spectral or temporal filtering have been developed in order to escape from narrowband jamming occupying less than 10 to 20% of the frequency band of the spread spectrum useful signal. They consist in detecting through a spectral analysis the part of the useful band affected by the jamming and in eliminating it from the signal received through a bandstop filtering. Detection is based on the fact that the useful signal has, in the absence of narrowband jamming, a flat white noise spectrum in the useful band and that the presence of a narrowband jammer is manifested by a peak of greater or lesser width deforming the spectrum of the signal received. This bandstop filtering impairs the signal received since it deprives it of part of its content. It cannot therefore be used for broadband jammers. However, it makes it possible to escape from a certain number of garbling signals consisting of a fixed pure carrier termed CW (Continuous Wave), a sweep carrier termed SCW (Sweep Continuous Wave), pulsed carrier termed PCW (Pulsed Continuous Wave) or one modulated by a narrowband modulation signal.

The techniques of antijamming by spatial filtering consist in modeling the radiation pattern of the receive antenna in such a way as to favor reception in the directions of the useful signals to the detriment of reception in the directions of the jamming signals. They have the advantage of being effective for any type of jamming whatsoever, be it narrowband or otherwise. The modeling of the radiation pattern of the receive antenna may be static or dynamic.

An example of static modeling of the radiation pattern of the receive antenna is encountered in the receivers of the GPS satellite navigation system where use is made of receive antennas architectured in such a way as to exhibit a hemispherical radiation pattern, turned skywards and excluding the directions with low angle of elevation, thereby making it possible to favor the reception of signals originating from satellites over the reception of necessarily jamming signals originating from transmitters close to the surface of the ground.

Examples of dynamic modeling of the radiation pattern of the receive antenna are also encountered in satellite navigation system receivers for which the use has been proposed of receive antennas consisting of arrays of elementary antennas and of an adjustable spatial combiner producing an amplitude-weighted and phase-weighted sum of the signals picked up by the various elementary antennas, and an automaton for adjusting the spatial combiner of the antenna providing either for the formation of paths pointing toward the satellites emitting the useful signals, these paths corresponding to narrow beams directed toward the satellites concerned, which technique is known by the name "Beam steered antenna array", or the creation of nulls in the reception pattern of the global antenna, in the directions of the jammers, which technique is known by the name "Controlled Reception Pattern Array" or, CRPA for short.

The "beam steered antenna array" technique is based on a priori knowledge of the relative positions of these transmitter satellites with respect to the receiver.

The CPRA technique is based on:
  static forming of several independent reception paths on the basis of the signals picked up by these elementary antennas of the array antenna used for reception, independence between reception paths signifying that none of them reduces to a simple linear combination of the others,
  generally, the central antenna is chosen as main reception path, the others being regarded as auxiliary, and
  dynamic forming of a so-called "degarbled" reception path by supplementing the signal of the main reception path with a linear combination of the signals of the auxiliary reception paths, amplitude-weighted and phase-weighted with the aid of coefficients that are altered dynamically so that the signals of the so-called "degarbled" reception path and of the auxiliary reception paths are decorrelated.

It is shown that the possible number of independent reception paths is less than or equal to that of elementary antennas of the receive array antenna and that, to be able to eliminate N jammers, there must be at least N independent auxiliary reception paths and hence an array antenna comprising at least N+1 elementary antennas must be available at reception.

The technique of antijamming by polarimetric filtering stems from the radar sector. It is based on the assumption according to which the signal picked up at reception, under cross polarimetry is essentially due to the jamming, and that it is thus possible by modifying the phase and the amplitude of the signal received under cross-polarimetry, to produce an image of the jamming affecting the signal picked up under matched polarization with a view to deducting it from the signal picked up under matched polarization and thus improve the signal-to-noise ratio of the useful signal. This assumption is strengthened furthermore in the sector of receivers for satellite navigation systems, by the fact that, for a receive antenna with hemispherical radiation pattern, it is impossible to obtain a matched polarization path or a cross-polarization path in all the directions of its radiation pattern, matching the polarization of the wave received in the matched polarization path or the crossing of polarization with respect to the wave received in the cross-polarization path being complied with well around the normal to the hemisphere and being complied with less and less on approaching the edges of the hemisphere. This impossibility further strengthens the predominant presence, in a cross-polarization path, of the most troublesome jamming signals, those with the same polarization as the useful signal, since they originate at the receive antenna via smaller angles of incidence than those via which the useful signals arrive, smaller angles of incidence for which the cross path is less mismatched.

As shown by American patent U.S. Pat. No. 3,883,872, thought has quickly been given to the application of this technique of antijamming by polarimetric filtering to the reception of an information channel in multichannel communication systems employing the same frequency band to transmit two simultaneous information channels according to orthogonal polarizations, the second information channel transmitted under cross-polarization then being regarded as an undesirable jamming signal.

More recently, it has proposed that this technique of antijamming by polarimetric filter be implemented within the framework of a GPS receiver. The GPS receiver is then equipped with a receive antenna simultaneously delivering a matched polarization path and a cross-polarization path. The signal of the cross-polarization path of the receive antenna is subtracted from the signal of the matched polarization path, while altering its amplitude and its phase to obtain an amplitude minimum for the resulting signal, for example by minimizing the output power under constraint. For further details regarding this technique of antigarbling by polarimetric filtering, reference may be made to American patent U.S. Pat. No. 5,712,641.

All these antijamming techniques improve the insensitivity of receivers of spread spectrum radio signals to jamming without however achieving total insensitivity, so much so that improvements are still sought. Thus it has been proposed, especially in American patent U.S. Pat. No. 6,141,371, that the techniques of antijamming by temporal filtering and by spatial filtering more precisely of CRPA type be combined.

SUMMARY OF THE INVENTION

An aim of the present invention is to improve the insensitivity to jamming of receivers of spread spectrum radio signals transmitted by polarized wave, in particular, within the framework of a satellite positioning system such as the GPS system.

Its subject is an antijamming method for a receiver of spread spectrum radio signals transmitted by polarized wave, noteworthy in that it consists:
  in providing said receiver with a receive array antenna comprising elementary antennas having at least one so-called matched output path, sensitive to the polarization of the polarized wave used for the transmission, certain elementary antennas furthermore having a second so-called cross output path, sensitive to a polarization orthogonal to that of the polarized wave used for the transmission,
  in performing first individual antijamming processings by polarimetric filtering on each of the elementary antennas with matched and cross output paths so as to derive from each of them, by combining the signals picked up by their matched and cross output paths, a single reception signal having undergone a first degarbling, and
  in globally performing, at the level of the reception signals originating from the first individual antijamming processings and the reception signals picked up by the elementary antennas devoid of cross output paths utilized, a second general antijamming processing by spatial filtering so as to derive by combining these reception signals, a reception signal having undergone a new degarbling, intended to be utilized by the receiver.

Advantageously, the first individual antijamming processings by polarimetric filtering consist in linearly combining, in phase and in amplitude, the signals picked up on the matched and cross output paths of one and the same elementary antenna in such a way as to obtain a minimum of energy after processing.

Advantageously, the first individual antijamming processings by polarimetric filtering are done with the aid of polarimetric filters all having the same adjustment, which adjustment is determined in such a way as to obtain a minimum of energy after processing for the one, taken as reference, of the elementary antennas with matched and cross output paths.

Advantageously, the first antijamming processings by polarimetric filtering are done independently of one another, with the aid of polarimetric filters adjusted individually in such a way as to obtain, each time, a minimum of energy after processing.

Advantageously, the second general antijamming processing by spatial filtering consists in linearly combining, in amplitude and in phase, the reception signals originating from the first individual antijamming processings by polarimetric filtering and the reception signals picked up by the elementary antennas devoid of cross output path utilized, with a view to electronic pointing of the receive array antenna giving the main lobe of its radiation pattern the form of a narrow beam pointing in the direction of the position of the emitter of the polarized wave used for the transmission of the spread spectrum radio signals.

Advantageously, the second general antijamming processing by spatial filtering consists in linearly combining, in amplitude and in phase, the reception signals originating from the first individual antijamming processings by polarimetric filtering and the reception signals picked up by the elementary antennas devoid of cross output path utilized, with a view to creating nulls in the radiation pattern of the receive array antenna in the directions of the jammers.

Advantageously, when the second general antijamming processing by spatial filtering consists in linearly combining, in amplitude and in phase, the reception signals originating from the first individual antijamming processings by polarimetric filtering and the reception signals picked up by the elementary antennas devoid of cross output path utilized, with a view to creating nulls in the radiation pattern of the receive array antenna in the directions of the jammers, one of the elementary antennas with matched and cross output paths is regarded as a reference elementary antenna and the other elementary antennas of the array antenna as auxiliary elementary antennas and the coefficients of the linear combination are altered dynamically so that the signal resulting from the linear combination is decorrelated with the reception signals of which it is composed, with the exception of the reception signal originating from the reference elementary antenna after a first individual antijamming processing by polarimetric filtering.

Advantageously, the polarimetric and spatial processings may be performed simultaneously when at least all the auxiliary elementary antennas are provided with two cross-polarization output paths.

Advantageously, additional antijamming processings by temporal or spectral filtering are performed on each of the reception signals originating from the first individual antijamming processings by polarimetric filtering and the reception signals picked up by the elementary antennas devoid of cross output path utilized, upstream of the second general antijamming processing by spatial filtering.

Advantageously, an additional antijamming processing by temporal or spectral filtering is performed after the second general antijamming processing by spatial filtering.

BRIEF DESCRIPTION OF THE DRAWINGS

Other characteristics and advantages of the invention will emerge from the description hereinbelow of several embodiments given by way of example. This description will be given in conjunction with the drawing in which:

a FIG. 1 illustrates, in the form of a block diagram, an antijamming device in accordance with the invention, a FIG. 2 illustrates an exemplary embodiment of polarimetric filtering for antijamming, a FIG. 3 illustrates an exemplary embodiment of the antijamming device shown in FIG. 1, and FIGS. 4 and 5 illustrate two variants of the antijamming device shown in FIG. 1, also incorporating temporal or spectral filtering.

DETAILED DESCRIPTION OF THE INVENTION

Figure 1:
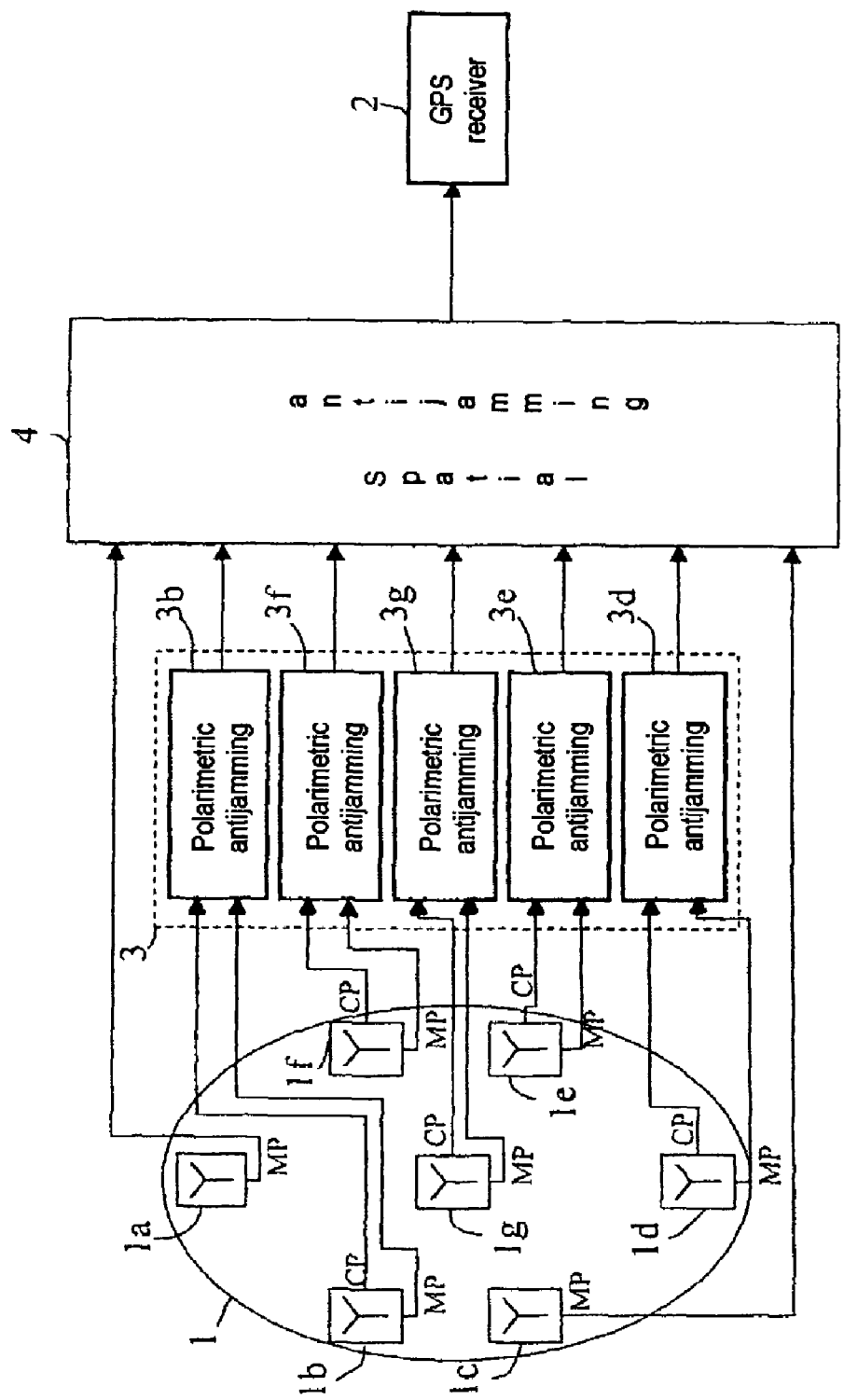

The device for antijamming by polarimetric and spatial filtering represented diagrammatically in FIG. 1 is intended to process in reception, spread spectrum radio signals originating from the satellites of the GPS navigation system. It is interposed between a receive antenna 1 picking up the waves emitted by the satellites and a GPS receiver 2 while possibly being shiftable to behind the input stages of the GPS receiver 2 so as to have access to signals of lower frequency that lend themselves more easily to digital processing. It comprises a first stage 3 with polarimetric filterings and a second stage 4 with spatial filtering.

The receive antenna 1 is an array antenna consisting of a collection of several elementary antennas $1a$, $1b$, ..., $1g$ with hemispherical radiation pattern directed upward so as to make it possible to pick up signals originating from nongeostationary satellites. It is configured so as to have a skyward pointing sensitivity limited to angles of elevation greater than a few degrees so as to be influenced as little as possible by terrestrial jammers.

The elementary antennas $1a$, $1b$, ..., $1f$ constituting the receive antenna 1 may be of various forms. They are for example of "patch" type. Numerous kinds thereof described in the prior art are known, such as those described in American patents U.S. Pat. No. 5,712,641 or U.S. Pat. No. 6,252,553. Certain $1b$, $1d$, $1e$, $1f$, $1g$ of its elementary antennas exhibit two simultaneous reception paths, one MP matched to the polarization of the waves emitted by the satellites of the navigation system, namely right circular polarization and the other CP, corresponding to the cross-polarization which here is left circular polarization.

When an elementary antenna $1b$, respectively $1d$, $1e$, $1f$ or $1g$ simultaneously delivers a reception path MP matched to the polarization of the wave transmitting the useful signal and a reception path CP corresponding to the cross-polarization, its two reception paths are combined into a single unified reception path by an individual adjustable combiner $3b$, respectively $3d$, $3e$, $3f$ or $3g$ which belongs to the stage 3 with polarimetric filterings of the antijamming device and which is set so as to produce a phase-weighted and amplitude-weighted combination favoring the useful signal to the detriment of the jamming signals. The unified reception paths originating from the individual combiners 3b, 3d, 3e, 3f, 3g and the reception paths MP originating from the elementary antennas 1a, 1c devoid of cross reception path CP or with unutilized cross reception paths CP are then applied to the stage 4 with spatial filtering of the antijamming device which produces a phase-weighted and amplitude-weighted global combination thereof yet further favoring the useful signal to the detriment of the jamming signals. This global combination constitutes the degarbled reception signal delivered by the antijamming device and fed to the GPS receiver 2.

Figure 2:
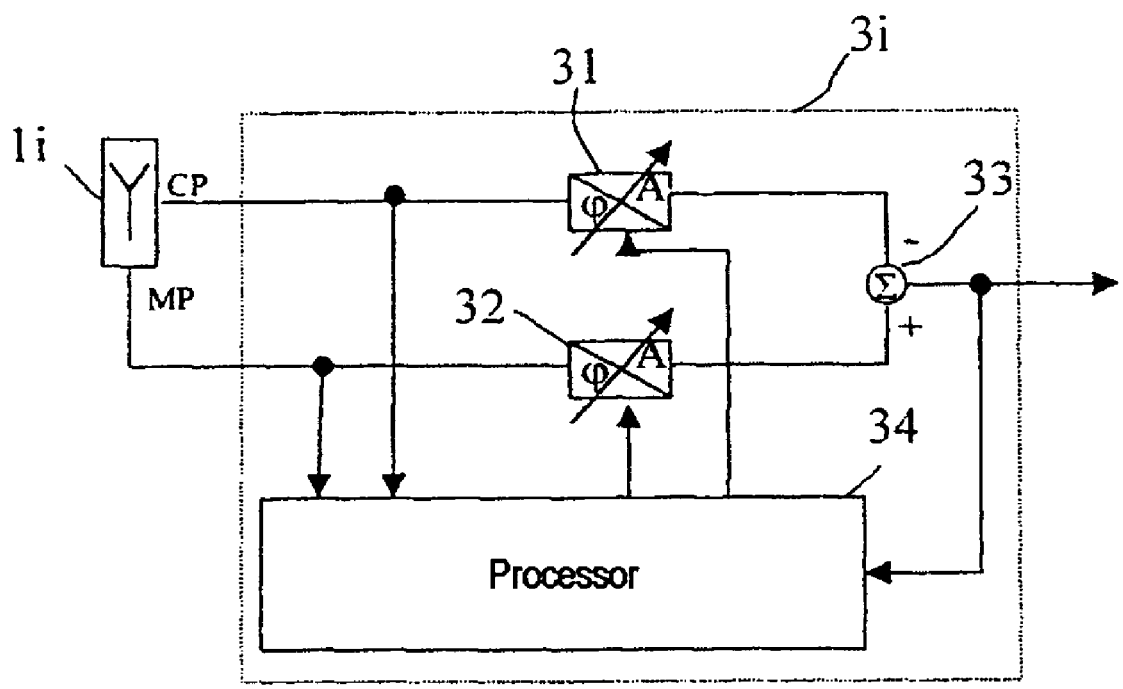

The most general makeup of an individual adjustable combiner 3i provided with a setting device, making it possible to unify the two matched MP and cross CP reception paths of an elementary antenna 1i within the stage 3 with polarimetric filterings is illustrated in FIG. 2. Depicted in this FIG. 2, in the guise of elements of the adjustable individual combiner 3i, are two adjustable individual attenuators/phase shifters 31, 32, one 31 processing the cross reception path CP of the elementary antenna 1i and the other 32 the matched reception path MP of the elementary antenna 1i, a subtractor 33 deducting the signal of the cross reception path CP available at the output of the adjustable individual attenuator/phase shifter 31 from the signal of the matched reception path MP available at the output of the adjustable individual attenuator/phase shifter 32 so as to constitute the signal of the unified reception path, and a processor 34 which determines the adjustment settings of the adjustable individual attenuators/phase shifters 31, 32 on the basis of the signals present at the antenna output on the matched MP and cross CP reception paths and of the signal present at the output of the subtractor 33.

To determine the adjustment settings of the individual adjustable attenuators/phase shifters 31, 32, the processor 34 calculates the amplitude and phase values to be applied to the matched MP and cross CP paths in such a way as to minimize the power of the interfering signals exhibiting a polarization other than right circular.

The structure of an adjustable individual combiner 3i of the stage 3 with polarimetric filterings can be simplified by eliminating the processor 34 if the stage 3 with polarimetric filterings already includes an adjustable individual combiner with complete structure. Specifically, it is possible to take as reference an elementary antenna with two reception paths, matched MP and cross CP, for example the elementary antenna 1g, to equip it with an individual adjustable combiner with complete structure and to equip all the other elementary antennas having two reception paths, matched MP and cross CP, the elementary antennas 1b, 1d, 1e, 1f in the example considered, with individual combiners having a simplified structure with no processor borrowing the adjustment settings adopted by the adjustable individual combiner with which the reference elementary antenna is equipped.

It is also possible to share a single processor between all the individual adjustable combiners of the stage 3 with polarimetric filterings. More generally, it is possible to apply at the level of each elementary antenna, all the antijamming processings by polarimetric filtering that it is known to apply at the level of two orthogonal-polarization reception paths of a global antenna.

Figure 3:
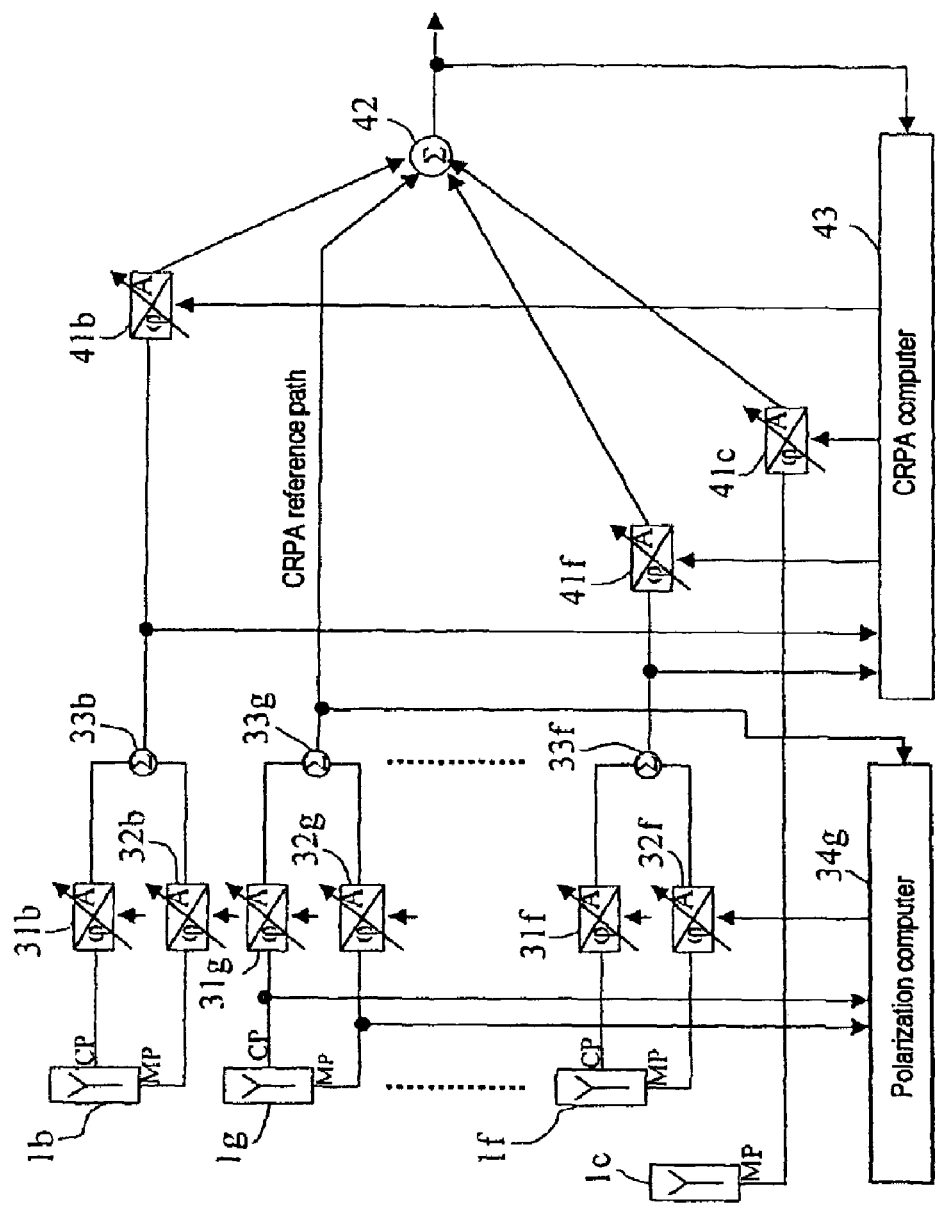

FIG. 3 illustrates a possible embodiment of an antijamming device with polarimetric and spatial filterings. Depicted therein, from left to right, are the elementary antennas of the receive array antenna, the elements of the individual adjustable combiners providing for the polarimetric filterings under the control of a polarization computer and the elements of an adjustable combiner providing for the spatial filtering under the control of a CRPA computer.

Among the elementary antennas represented in FIG. 3, certain 1c only have the matched reception path MP utilized so that their reception signal is not subjected to any utilized antijamming processing by polarimetric filtering while others 1b, 1g, . . . , 1f have two reception paths, a matched path MP and a cross path CP that are utilized and unified by polarimetric antijamming filterings.

The polarimetric antijamming filterings carried out at the level of the elementary antennas 1b, respectively 1g, . . . , 1f having two utilized reception paths, one matched MP, the other cross CP, by means of individual adjustable combiners 31b, 32b, 32c, respectively 31g, 32g, 33g, . . . , 31f, 32f, 33f are all identical since they use the same adjustment settings determined by a polarization computer 34g taking the elementary antenna 1g as reference.

The spatial filtering is performed on the unified reception paths resulting from the polarimetric antijamming filterings applied to the elementary antennas 1b, 1g, . . . , 1f having two utilized reception paths, one matched MP and the other cross CP and on the matched reception paths MP of the elementary antennas 1c having only a utilized reception path, by means of a combiner formed of individual adjustable attenuators/phase shifters 41b, 41f, 41c equipping all the reception paths taken into account with the exception of the unified reception path originating from the elementary antenna 1g taken as reference in the spatial filtering, of a summator 42 summing the various paths taken into account and of a computer of adjustment coefficients 43 implementing the CRPA technique mentioned previously, which technique consists in creating nulls in the radiation pattern of the receive array antenna 1, in the directions of the jammers, and which relies on the procedure for dynamically reducing the power of garbling signals by side lobe cancelation as developed by radar experts and known by the initials C.S.L.C. standing for "Coherent Side Lobe Canceller").

As indicated previously, it is also possible to carry out the antijamming spatial filtering by implementing the technique of computational beam forming (known as beam steered array) also developed by radar experts, which consists in combining, phase-wise and amplitude-wise, the signals of the reception paths subjected to spatial filtering so as to obtain, in the radiation pattern of the global antenna, one or more narrow beams directed toward the useful signal transmitters. This technique does not call upon a reference path. It requires the presence of adjustable attenuators/phase shifters on all the reception paths taken into account as well as the knowledge of the relative directions of the useful signal transmitters with respect to the receiver. More generally, it is possible to apply at the level of the spatial filtering stage (4 FIG. 1) all the already-known techniques of antijamming by spatial filtering.

Figure 4:
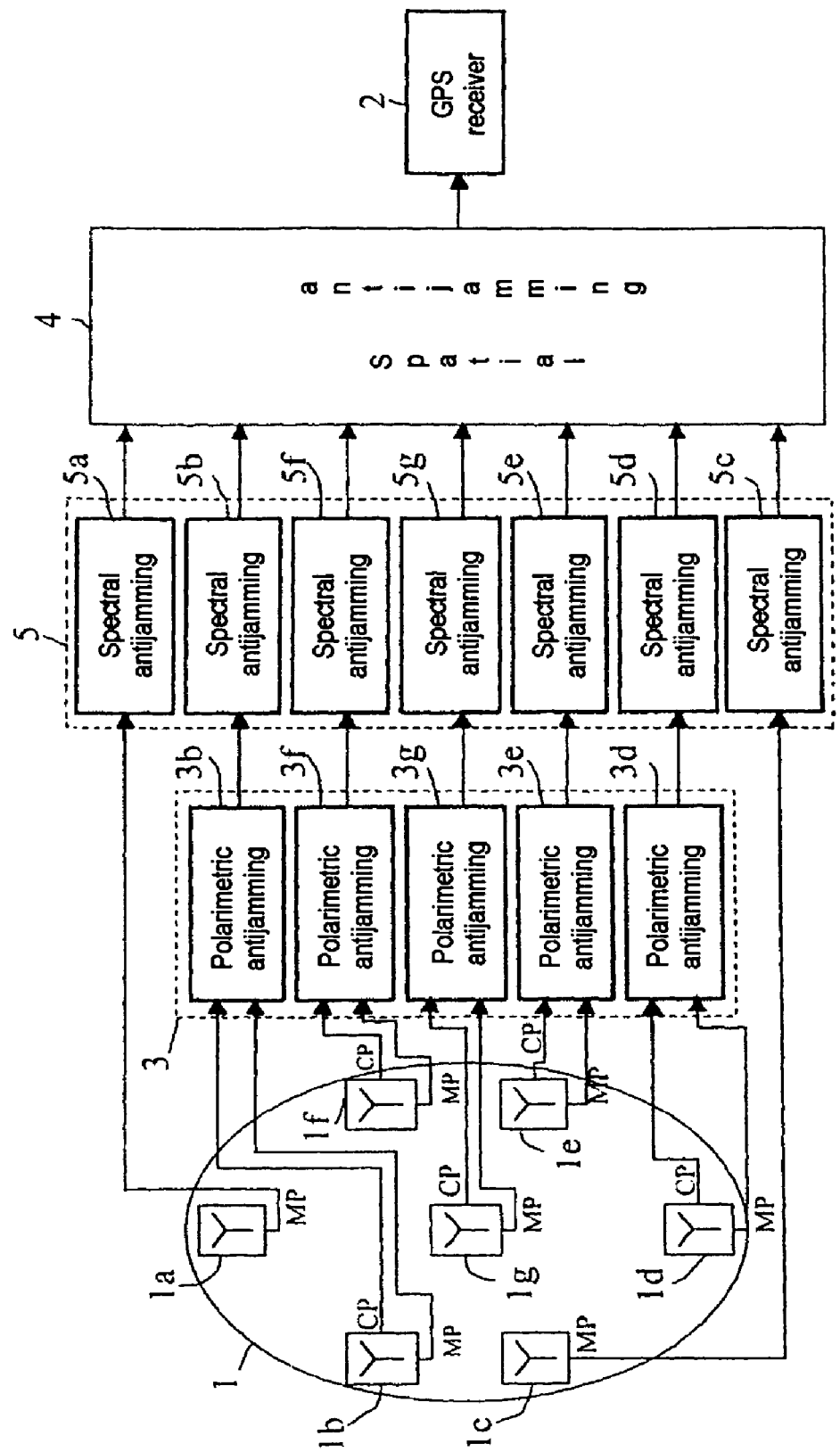
Figure 5:
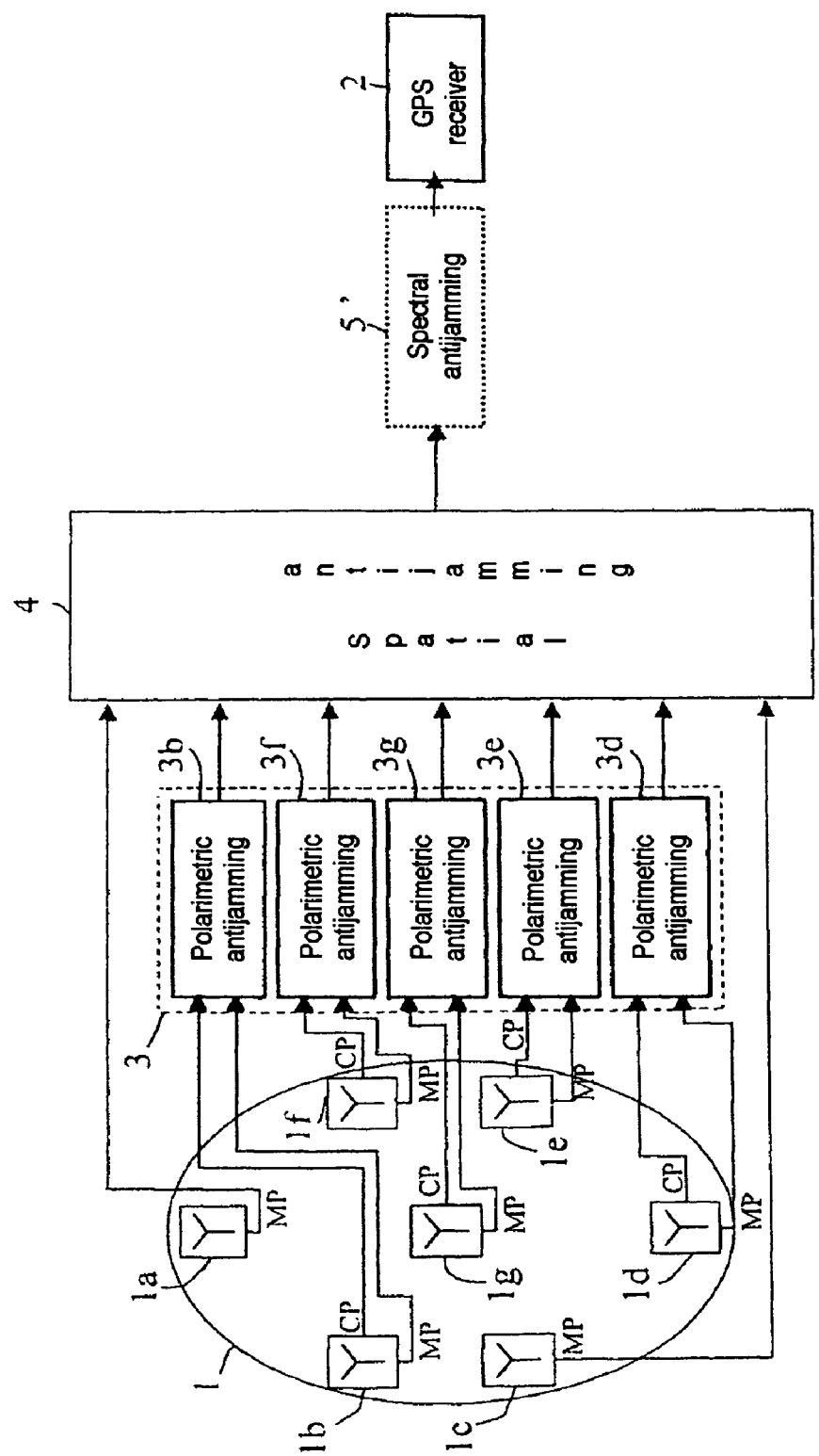

FIGS. 4 and 5 illustrate antijamming device variants which differ from the antijamming device described in relation to FIG. 1 through the addition of a stage for antijamming by temporal or spectral filtering. In these FIGS. 4 and 5, the elements that are invariant with respect to FIG. 1 have retained their original labels.

As indicated previously, the antijamming by temporal or spectral filtering consists in suppressing or reducing the spectral lines exceeding the noise in the frequency band occupied by the spread spectrum useful signals since it can only originate from jamming. This suppression or reduction of the spectral lines also modifies the components of like frequency of the spread spectrum useful signal which is thereby impoverished but this impoverishment is tolerable as long as it does not exceed 10 to 20% of the frequency band used. The garbling spectral lines are detected by spectral analysis and suppressed or reduced by matched filtering carried out in the frequency or time domain. There are numerous ways of carrying out antijamming by temporal or spectral filtering. Some of them are alluded to in American patent U.S. Pat. No. 6,141,371 already cited.

In the antijamming device represented in FIG. 4, the antijamming by temporal or spectral filtering intervenes following the antijamming by polarimetric filtering but prior to the antijamming by spatial filtering. To do it, a stage 5 with temporal or spectral filterings is interposed between the stage with polarimetric filterings 3 and the stage 4 with spatial filtering. This stage 5 with temporal or spectral filterings is composed of individual temporal or spectral filters 5a, 5b, 5f, 5g, 5e, 5d, 5c with adjustable coefficients, which process each of the reception paths taken into account by the spatial filtering. As in the case of polarimetric filters, the temporal or spectral filters can all have the same adjustment setting calculated by a processor on the basis of the characteristics of the signal traveling along that one of the reception paths taken as reference.

In the antijamming device of FIG. 5, the antijamming by temporal or spectral filtering intervenes last after the antijamming by spatial filtering. Embodiment thereof is simpler than in the case of the previous FIG. 4 since it now requires only a single temporal or spectral filter 5 with adjustable coefficients. On the other hand, its beneficial effect of reducing the jamming power does not make itself felt at the level of the determination of the amplitude- and phase-weighting coefficients of the spatial filter.

For ease of understanding, the polarimetric and spatial filtering processings have been shown, in FIGS. 1, 3, 4 and 5 as carried out by separate circuits. It is quite obvious that in practice the two polarimetric and spatial filterings may be accomplished by a common circuit. When the polarimetric and spatial filterings are performed behind the input stages of a receiver at the level of signals available in digitized sample forms, they may in fact be entrusted to a single signal processor on condition that the latter has sufficient computational power.

The invention claimed is:

1. An antijamming method for a receiver of transmitted polarized spread spectrum radio signals, the receiver having a receive array antenna including elementary antennas having at least one matched output path MP, the antennas being sensitive to a polarization of a transmitted polarized signal, certain elementary antennas, having a second cross output path CP sensitive to a polarization orthogonal to that of a transmitted polarized signal used for the transmission, the method comprising the steps of:

performing first individual antijamming processings by polarimetric filtering on each of the elementary antennas with matched MP and cross CP output paths so as to derive from each of them, by combining the signals picked up by their matched MP and cross CP output paths, a single reception signal having undergone a first degarbling, and globally performing, at the level of reception signals originating from the first individual antijamming processings by polarimetric filtering and the reception signals picked up by the elementary antennas devoid of cross output paths CP utilized, a second general antijamming processing by spatial filtering so as to derive by combining these reception signals, a reception signal having undergone a new degarbling.

2. The method as claimed in claim 1, wherein the antijamming processing done by polarimetric filtering and spatial filtering are performed simultaneously by one and the same processing circuit.

3. The method as claimed in claim 1, wherein the first individual antijamming processings by polarimetric filtering linearly combine, in phase and in amplitude, the signals picked up on the matched MP and cross CP output paths of one and the same elementary antenna to obtain a minimum of energy after processing.

4. The method as claimed in claim 1, wherein the first individual antijamming processings by polarimetric filtering are done with polarimetric filters all having the same adjustment, which adjustment is determined to obtain a minimum of energy after processing for the one, taken as reference, of the elementary antennas with matched MP and cross CP output paths.

5. The method as claimed in claim 1, wherein the first individual antijamming processings by polarimetric filtering are done independently of one another, with polarimetric filters adjusted individually to obtain, each time, a minimum of energy after processing.

6. The method as claimed in claim 1, wherein the second general antijamming processing, by spatial filtering is done with a spatial filter linearly combining, in amplitude and in phase, the reception signals originating from the first individual antijamming processings by polarimetric filtering and the reception signals picked up by the elementary antennas devoid of cross output path CP utilized and using the beam steered antenna array technique for obtaining an electronic pointing of the receive array antenna giving the main lobe of its radiation pattern the form of a narrow beam pointing in the direction of the position of the emitter of the polarized wave used for the transmission of the spread spectrum radio signals.

7. The method as claimed in claim 1, wherein the second general antijamming processing by spatial filtering is done with a spatial filter linearly combining, in amplitude and in phase, the reception signals originating from the first individual antijamming processings by polarimetric filtering and the reception signals picked up by the elementary antennas devoid of cross output path CP utilized, and using the Controlled Reception Pattern Antenna technique for creating nulls in the radiation pattern of the receive array antenna in the directions of the jammers.

8. The method as claimed in claim 1, wherein the second general antijamming processing is done with a spatial filter linearly combining, in amplitude and in phase, the reception signals originating from the first individual antijamming processings by polarimetric filtering and the reception signals picked up by the elementary antennas devoid of cross output path CP utilized, using, for creating nulls in the radiation pattern of the receive array antenna in the directions of the jammers, one of the elementary antennas with matched MP and cross CP output paths regarded as a reference elementary antenna and the other elementary antennas of the array antenna regarded as auxiliary elementary antennas and altering dynamically the coefficients of the linear combination so that the signal resulting from the linear combination is decorrelated with the reception signals of which it is composed, with the exception of the reception signal originating from the reference elementary antenna after a first individual antijamming processing by polarimetric filtering.

9. The method as claimed in claim 1, wherein additional antijamming processings by temporal or spectral filtering are performed on each of the reception signals originating from the first individual antijamming processings by polarimetric filtering and the reception signals picked up by the elementary antennas devoid of cross output path CP utilized, upstream of the second general antijamming processing by spatial filtering.

10. The method as claimed in claim 1, wherein an additional antijamming processing by temporal or spectral filtering is performed after the second general antijamming processing by spatial filtering.

11. The method as claimed in claim 2, wherein the first individual antijamming processings by polarimetric filtering linearly combine, in phase and in amplitude, the signals picked up on the matched MP and cross CP output paths of one and the same elementary antenna to obtain a minimum of energy after processing.

12. The method as claimed in claim 2, wherein the first individual antijamming processings by polarimetric filtering are done with polarimetric filters all having the same adjustment, which adjustment is determined to obtain a minimum of energy after processing for the one, taken as reference, of the elementary antennas with matched and cross output paths.

13. The method as claimed in claim 2, wherein the first individual antijamming processings by polarimetric filtering are done independently of one another, with the aid of polarimetric filters adjusted individually to obtain, each time, a minimum of energy after processing.

14. The method as claimed in claim 2, wherein the second general antijamming processing is done with a spatial filter linearly combining in amplitude and in phase, the reception signals originating from the first individual antijamming processings by polarimetric filtering and the reception signals picked up by the elementary antennas devoid of cross output path CP utilized, using for creating nulls in the radiation pattern of the receive array antenna in the directions of the jammers, one of the elementary antennas with matched MP and cross CP output paths being regarded as a reference elementary antenna and the other elementary antennas of the array antenna regarded as auxiliary elementary antennas, and altering dynamically the coefficients of the linear combination so that the signal resulting from the linear combination is decorrelated with the reception signals of which it is composed, with the exception of the reception signal originating from the reference elementary antenna after a first individual antijamming processing by polarimetric filtering.

15. The method as claimed in claim 2, wherein additional antijamming processings by temporal or spectral filtering are performed on each of the reception signals originating from the first individual antijamming processings by polarimetric filtering and the reception signals picked up by the elementary antennas devoid of cross output path CP utilized, upstream of the second general antijamming processing by spatial filtering.

16. The method as claimed in claim 2, wherein an additional antijamming processing by temporal or spectral filtering is performed after the second general antijamming processing by spatial filtering.

17. An antijamming receiver, comprising:

a receive array antenna including elementary antennas having at least one matched output path MP, sensitive to the polarization of the polarized wave used for the transmission, some of said elementary antennas having a second cross output path CP, sensitive to a polarization orthogonal to that of a polarized wave used for the transmission, polarimetric filters for performing first individual antijamming processings by polarimetric filtering on each of the elementary antennas with matched MP and cross CP output paths so as to derive from each of them, by combining the signals picked up by their matched MP and cross CP output paths, a single reception signal having undergone a first degarbling, and, a spatial filter for globally performing, at the level of reception signals originating from the first individual antijamming processings and reception signals picked up by said elementary antennas devoid of cross output paths CP utilized, a second general antijamming processing by spatial filtering so as to derive by combining these reception signals, a reception signal having undergone a new degarbling.

18. The antijamming receiver as claimed in claim 17, wherein the polarimetric filters have the same adjustment, which adjustment is determined to obtain a minimum of energy after processing for the one, taken as reference, of the elementary antennas with matched and cross output paths.

19. The antijamming receiver as claimed in claim 17, wherein the spatial filter uses the beam steered antenna array technique for obtaining an electronic pointing of the receive array antenna giving the main lobe of its radiation pattern the form of a narrow beam pointing in the direction of the position of the emitter of the polarized wave used for the transmission of the spread spectrum radio signals.

20. The antijamming receiver as claimed in claim 17, wherein the spatial filter uses the Controlled Reception Pattern Antenna technique for creating nulls in the radiation pattern of the receive array antenna in the directions of the jammers, one of the elementary antennas with matched MP and cross CP output paths being regarded as a reference elementary antenna and the other elementary antennas of the array antenna as auxiliary elementary antennas and the coefficients of the linear combination being altered dynamically so that the signal resulting from the linear combination is decorrelated with the reception signals of which it is composed, with the exception of the reception signal originating from the reference elementary antenna after a first individual antijamming processing by polarimetric filtering.

21. The antijamming receiver as claimed in claim 17, wherein additional antijamming processings by temporal or spectral filtering are performed on each of the reception signals originating from the first individual antijamming processings by polarimetric filtering and the reception signals picked up by the elementary antennas devoid of cross output path CP utilized, upstream of the second general antijamming processing by spatial filtering.

* * * * *